Dec. 27, 1949     E. G. MARHOFER     2,492,588
PLASTICITY OF DOUGHS
Filed Jan. 8, 1945
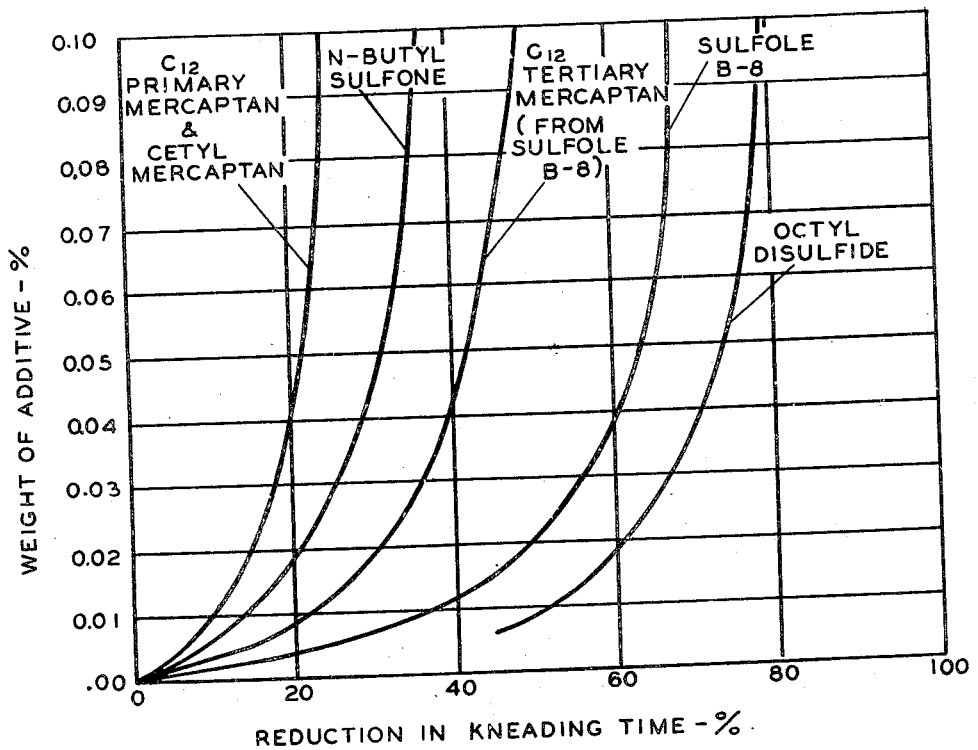
INVENTOR
E. G. MARHOFER
BY Hudson & Young
ATTORNEYS Patented Dec. 27, 1949

2,492,588

UNITED STATES PATENT OFFICE 2,492,588

PLASTICITY OF DOUGHS

Edwin G. Marhofer, Bartlesville, Okla., assignor to Phillips Petroleum Company, a corporation of Delaware Application January 8, 1945, Serial No. 571,762

18 Claims. (Cl. 99—91)

1

This invention relates to the production of bakery products. More specifically the present invention relates to a process whereby certain organic sulfur compounds are incorporated as additives into dough to improve the plasticity thereby reducing the mixing time in the preparation of the dough and improving the quality of the baked product. In one aspect this invention relates to the addition of small quantities of alkyl sulfur compounds or the alkyl derivatives of hydrogen sulfide into baking doughs to reduce mixing time and improve properties of the baked products.

The mixing time required for a dough is determined largely by the plasticity, a property developed by virtue of the wheat protein or gluten present. A dough of high plasticity is relatively soft, tender and easily workable, while a dough of low plasticity is firm, tough and hard to work or knead. The plasticity should not be so high as to make the dough substantially lose its texture and should be such as to permit the retention of a proper consistency after mixing is completed. The contact of flour with moisture results in the expansion of the gluten and the development in the dough of such properties as elasticity, cohesiveness and firmness. In order to realize full benefit from the gluten present, that is, to obtain the maximum in these important properties, it is necessary that mixing be complete. It is obvious that a dough of a desirable stiffness and firmness and having a low plasticity will necessitate longer and more vigorous mixing treatment. Since a high quality or "strong" flour is one which imparts lower plasticity to the dough and gives a good yield of a superior product, considerable attention has been directed toward processing means whereby the advantages of firm consistency and low plasticity can be retained and the disadvantages as related to mixing can be overcome. Subsequent to the mixing, a dough is allowed to stand during which time it recovers its original properties to a greater or less degree depending upon such factors as the conditions of mixing, the time of mixing and the presence of various ingredients. With a dough of low plasticity there is danger of overmixing thereby resulting in a lengthening of the period required for the dough to recover its original properties. On extended overmixing, doughs tend to lose extensibility and to increase in resistance to extension on standing, thus adversely affecting the quality of the final products. It is desirable to provide a means for increasing the softness and plasticity during mixing and

2 thereby reduce energy requirements with the subsequent development of minimum plasticity when the mixture is allowed to stand. The utilization of such a method would mean a reduction in process period preliminary to baking. Such a decrease in time requirements would be economically advantageous since the output of a bakery may be substantially increased by virtue of the decreased time during which mechanical equipment is employed per batch. The preparation of a product with improved characteristics is a further benefit to be derived from reduced process periods.

The primary object of this invention is to provide a process whereby the kneading or mixing time for bakery products is reduced. Another object of this invention is to incorporate certain organic sulfur compounds into bakery dough to increase or improve its plasticity. It is also an object to improve the quality of the baked products by the addition of certain organic sulfur compounds. Still another object is to provide a method of mixing organic sulfur compounds into the dough to insure uniform distribution of the compounds throughout.

Applicant has discovered that the incorporation of minor proportions of certain organic sulfur compounds into the dough before or during mixing or kneading, will effectively and substantially increase plasticity and softness of the dough and materially reduce kneading time and consequently the power required for this operation. In addition beneficial effects on quality of the baked product are obtained. The sulfur compounds utilized in accomplishing the objects of this invention are organic sulfur compounds having an alkyl radical, and in general comprise organic sulfur compounds in which at least one alkyl radical is directly attached to at least one sulfur atom. Such compounds are commonly referred to as alkyl derivatives of hydrogen sulfide and this term includes the compounds found to be particularly efficacious in the present invention. The compounds particularly useful as described herein include the mono-alkyl derivatives of hydrogen sulfide such as mercaptans, and the poly-alkyl derivatives of hydrogen sulfide having two or more alkyl radicals per molecule such as sulfides, disulfides, sulfoxides, sulfones, disulfones, etc. Therefore, in a more specific aspect, the present invention relates to the incorporation into dough of one or more alkyl sulfur compounds selected from the group consisting of mercaptans, sulfides, disulfides, sulfoxides and sulfones which represent preferred classes of compounds of the type described.

In general, the addition of small amounts of organic sulfur compounds of the present invention to baking doughs decreases the mixing time in the preparation of the dough. This decrease in time and energy of mixing also improves the quality of the baked product by improving texture and other characteristics. Either a single compound or a plurality of compounds of the type described may be added to the dough to accomplish the desired results. The most effective quantity of additive employed depends primarily on the particular sulfur compounds and to some extent on the nature of the ingredients comprising the dough. It has also been found that the effect of additional sulfur compound beyond a certain concentration is negligible. Various methods of incorporating the additive into the dough to insure uniform distribution may be used, and one preferred method is to mix the selected sulfur compound with the shortening.

These organic sulfur compounds effect a measurable increase in the plasticity and decrease in the energy requirements in baking doughs and thus reduce the time of kneading or mixing. The alkyl derivatives of hydrogen sulfide are especially suited as additives for this purpose because of their high effectiveness and their consistency. Thus, while virtually all the organic sulfur compounds of the type described influence the plasticity of dough, factors of odor, taste, and toxicity make certain compounds of the alkyl derivatives of hydrogen sulfide preferable. Compounds from the above group having molecular weights in excess of about 145 satisfy these requirements of odor, taste, and toxicity since they are stable and non-volatile at the baking temperatures of 350–450° F. In the mercaptan series the aliphatic mercaptans having from 10 to 16 carbon atoms per molecule were found to be very effective in increasing the plasticity of the dough when present in relatively small quantities. Alkyl sulfides, disulfides, sulfoxides, and sulfones having four or more carbon atoms per alkyl group also function efficiently in accomplishing the objects of this invention and at the same time result in baked products free from unpleasant odor and taste. The addition of these organic sulfur compounds increased the quality of the resulting product and in many cases gave a much whiter bread. In general, normally liquid compounds of the type referred to are most suitable.

Examples of specific compounds which possess the required characteristics are $C_{12}$ primary mercaptan, $C_{12}$ tertiary mercaptan, cetyl mercaptan, n-heptyl sulfide, n-butyl sulfone, octyl disulfide, and n-butyl sulfoxide. The octyl disulfide was exceedingly effective in increasing the plasticity and decreasing the energy requirements of the dough. A commercial product ("Sulfole B-8") consisting essentially of a mixture of $C_{12}$ tertiary mercaptans also was tried with satisfactory results.

It is not intended that the compounds listed above are the only ones applicable for the purpose of this invention. In their effect on plasticity of doughs, the compounds mentioned herein, although not the exact equivalents, are representative and characteristic of other alkyl derivatives of hydrogen sulfide included in such groups as alkyl mercaptans, sulfides, disulfides, sulfoxides, sulfones, and disulfones.

The addition of the various organic sulfur compounds beyond a concentration of 0.1 per cent by weight does not appreciably further increase the plasticity of the dough. The drawing graphically illustrates comparative results for various representative additives. Weight per cent of additive is plotted against reduction in kneading time by comparison with a dough having no additive incorporated therein. It can be seen that addition of more than about 0.10 per cent additive fails to produce appreciably greater improvement and it is apparent that this percentage represents the amount beyond which further improvement is not substantially obtained. The maximum amount of additive required for its most effective use was similar for all the compounds investigated and it was found that generally speaking, amounts of additive over one per cent made the dough too sticky and fluid for optimum conditions of mixing. Therefore, for the above reasons and in order to satisfy taste and odor requirements, quantities less than one per cent by weight of product recipe should generally be used, and preferably quantities within the range of 0.1 and 0.001 per cent.

The most effective means of assuring uniform distribution of the additive throughout the dough was the incorporation of the selected sulfur compounds within the shortening preliminary to mixing it with the other ingredients. The shortening acts as a solubilizer for the additive. The additive may be incorporated in other ways as by addition to the flour before making the dough, or to the dough mixture during mixing.

While the mechanism of increasing the plasticity is not thoroughly understood, the action of the additives appears to be that of conditioning the protein. Proteins possess high molecular weights, that is, weights ranging from about 17,000 up to values in the millions. While classical theory teaches that proteins are comprised of long straight chains of peptide units, more recent investigations indicate that growth of such units may be lateral as well as linear. It is possible, therefore, that the sulfur compounds of this invention may have an effect on these cross-linkages altering them in such a manner as to cause an increase in the plasticity or softness of the material. Generally speaking, observations show that the additives will not only effect a reduction in the mixing time by producing a softening action on doughs but will improve such properties as texture, color and the like in the finished products.

The following examples are offered to illustrate further the action of certain specific sulfur compounds when employed as additives in bread dough and should not be construed to limit the invention.

EXAMPLE I

A sample of octyl disulfide, prepared from $C_8$ tertiary mercaptan by oxidation, was used as an additive in bread dough to determine the effect upon the plasticity of the dough during the mixing process. To the standard bread recipe a small quantity of potassium bromate was added. The octyl disulfide was incorporated into the fat preliminary to mixing it with the other materials. The conventional order of adding the ingredients was followed. A control batch was run for comparative purposes. Table I shows the weight percentages of the ingredients used in the standard recipe, the additive, and the mixing time required. The weight percentage of additive was calculated on the basis of the total weight per cent of the ingredients in the control recipe.

Table I

|  | Control | Octyl Disulfide |
|---|---|---|
| Ingredients of Bread Mix, Wt. per cent: |  |  |
| Flour | 61.88 | 61.88 |
| Shortening | 1.38 | 1.38 |
| Sugar | 1.23 | 1.23 |
| Salt | 0.60 | 0.60 |
| Water | 33.62 | 33.62 |
| Compressed Yeast | 1.27 | 1.27 |
| Potassium Bromate | 0.02 | 0.02 |
| Additive, Wt. Per cent of Control Mixture | 0.00 | 0.03 |
| Kneading Time, Minutes | 30 | 11 |
| Reduction in Kneading Time, per cent | | 63.3 |

EXAMPLE II

A series of experiments was carried out to determine the effect of varying concentrations of a given additive upon the plasticity of bread dough with particular attention directed toward a reduction in the kneading time required to produce substantially the same appearance in each sample of dough. The additive chosen for this series of tests was a mixture of isomeric tertiary mercaptans, a commercial product ("Sulfole B-8"), prepared from a complex mixture of nominally $C_{12}$ olefins of relatively restricted boiling range by condensation with hydrogen sulfide in the presence of a suitable catalyst such as synthetic silica-alumina gel. This mixture of isomeric mercaptans is a pale yellow liquid with an average molecular weight of about 195. A standard recipe for bread making was followed and, in addition, a small quantity of potassium bromate was incorporated into the dough. The conventional order of adding ingredients was used with the exception of the additive which was mixed with the melted fat prior to its addition to the other ingredients. The tabulation which follows shows the results of these tests:

*Test using commercial mixture of $C_{12}$ tertiary mercaptans*

|  | Control | 1 | 2 | 3 | 4 |
|---|---|---|---|---|---|
| Ingredients of Bread Mix, Wt. per cent: |  |  |  |  |  |
| Flour | 60.72 | 60.72 | 60.72 | 59.39 | 59.92 |
| Shortening | 1.43 | 1.43 | 1.43 | 1.47 | 1.45 |
| Sugar | 1.27 | 1.27 | 1.27 | 1.31 | 1.29 |
| Salt | 0.62 | 0.62 | 0.62 | 0.64 | 0.64 |
| Water | 34.63 | 34.63 | 34.63 | 35.82 | 35.35 |
| Compressed Yeast | 1.31 | 1.31 | 1.31 | 1.35 | 1.33 |
| Potassium Bromate | 0.02 | 0.02 | 0.02 | 0.02 | 0.02 |
| Additive, Wt. per cent of Control Mixture | 0.00 | 0.008 | 0.0175 | 0.035 | 0.10 |
| Kneading Time, Minutes | 24 | 15 | 12 | 9 | 7 |
| Reduction in Kneading Time, per cent | | 27.5 | 50.0 | 60.8 | 70.8 |

It should be noted the most efficient use of the additive would require not more than 0.1 per cent incorporated into the recipe.

EXAMPLE III

Using the standard recipe for bread and the procedure described in Example II, a series of experiments was conducted to determine the effect of sulfides, sulfones and primary mercaptans as softening agents for dough. For comparative purposes a control was run and also a batch using a sample of the commercial mixture of $C_{12}$ tertiary mercaptans from Example II. The percentages of the ingredients used in the bread mix were the same as those given in Example I. The subjoined tabulation shows the results of these tests.

|  | Additive, Wt. per cent of Control Mixture | Reduction in Kneading Time, per cent |
|---|---|---|
| Commercial Mixture of $C_{12}$ Tertiary Mercaptans | 0.035 | 60.8 |
| $C_{12}$ Tertiary Mercaptan | 0.03 | 37.5 |
| n-Heptyl Sulfide | 0.03 | 18.2 |
| n-Butyl Sulfone | 0.03 | 27.3 |
| $C_{12}$ Primary Mercaptan | 0.03 | 18.2 |
| Cetyl Mercaptan | 0.03 | 18.2 |
| Octyl Disulfide | 0.03 | 63.3 |

Bread baked from the dough mixtures containing the additive as described in the foregoing examples proved to possess a better, more uniform porous texture, and whiter color, and retained its shape better during baking, than the control samples.

Although I have described my invention in detail with the inclusion of certain specific embodiments, it will be obvious to those skilled in the art that many variations and modifications may be practiced without departing from the scope of the broad disclosure.

I claim:

1. A method for increasing the plasticity of dough which comprises incorporating within said dough a minor proportion and at least 0.001 per cent by weight of an unsubstituted alkyl sulfur compound having at least one unsubstituted alkyl radical directly attached to at least one sulfur atom.

2. A method for improving the mixing properties of dough which comprises incorporating into said dough an unsubstituted alkyl sulfur derivative having a molecular weight in excess of 145 and selected from the group consisting of unsubstituted alkyl mercaptans, unsubstituted alkyl sulfides, unsubstituted alkyl disulfides, unsubstituted alkyl sulfoxides and unsubstituted alkyl sulfones, in an amount sufficient to effect a reduction in the kneading time thereof.

3. A process according to claim 2 in which the alkyl sulfur derivative is admixed with said dough in the proportion of from about 0.001 to 0.1 per cent.

4. A method according to claim 2 in which the alkyl derivative is an unsubstituted alkyl mercaptan.

5. A method according to claim 2 in which the alkyl derivative is a primary mercaptan.

6. A method according to claim 2 in which the alkyl derivative is a tertiary mercaptan.

7. A method according to claim 2 in which the alkyl derivative is cetyl mercaptan.

8. A method according to claim 2 in which the alkyl derivative comprises a mixture of unsubstituted tertiary mercaptans having from 10–14 carbon atoms.

9. A method according to claim 2 in which the alkyl derivative is a tertiary $C_{12}$ mercaptan.

10. A method according to claim 2 in which the alkyl derivative is a disulfide.

11. A method according to claim 2 in which the alkyl derivative is octyl disulfide.

12. A method according to claim 2 in which the alkyl derivative is a sulfide.

13. A method according to claim 2 in which the alkyl derivative is n-heptyl sulfide.

14. A method according to claim 2 in which the alkyl derivative is a sulfone.

15. A method according to claim 2 in which the alkyl derivative is n-butyl sulfone.

16. A dough mixture including flour, shortening and water, and having as a constituent thereof between about 0.001 to 0.1 per cent by weight of an unsubstituted alkyl sulfur compound selected from the group consisting of unsubstituted alkyl mercaptans, unsubstituted alkyl sulfides, unsubstituted alkyl disulfides, unsubstituted alkyl sulfoxides and unsubstituted alkyl sulfones.

17. A baked product having improved properties and having incorporated therein an unsubstituted alkyl sulfur compound having a molecular weight greater than 145 and selected from the group consisting of unsubstituted alkyl mercaptans, unsubstituted alkyl sulfides, unsubstituted alkyl disulfides, unsubstituted alkyl sulfoxides and unsubstituted alkyl sulfones, in the proportion of between about 0.001 to 0.1 per cent by weight.

18. A method for increasing the plasticity of dough during kneading which comprises incorporating within said dough at least 0.001 per cent by weight of an unsubstituted alkyl sulfur compound selected from the class consisting of unsubstituted alkyl mercaptans, unsubstituted alkyl sulfides, unsubstituted alkyl disulfides, unsubstituted alkyl sulfoxides, and unsubstituted alkyl sulfones.

EDWIN G. MARHOFER.

REFERENCES CITED

The following references are of record in the file of this patent:

UNITED STATES PATENTS

| Number | Name | Date |
|---|---|---|
| 2,158,775 | Harris | May 16, 1939 |
| 2,280,031 | Weber | Apr. 14, 1942 |

FOREIGN PATENTS

| Number | Country | Date |
|---|---|---|
| 117,421 | Australia | Sept. 2, 1943 |
| 117,586 | Australia | Oct. 21, 1943 |

OTHER REFERENCES

Balls & Hale, "A Sulphur-bearing Constituent of the Petroleum Ether Extract of Wheat Flour," Cereal Chemistry, vol. 17, Mar. 1940, pg. 245.

Ziegler, "Dough Improvement Studies II and III," Cereal Chemistry, vol. 17, Sept. 1940, pages 551 to 564.

Elion, "The Action of Glutathione and Wheat Germ on Dough in Relation to the Proteolytic Enzymes in Wheat Flour," Cereal Chemistry, March 1943, pages 234 to 250.